Jan. 20, 1925.　　　　　　　　　　　　　　　　　　　1,523,916
A. E. TOMPKINS
APPARATUS FOR SEPARATING LIQUIDS FROM GASES OR FOR THE DRYING OF
AIR AND GASES, PARTICULARLY APPLICABLE AS A STEAM DRIER
Original Filed Jan. 15, 1923　　2 Sheets-Sheet 1
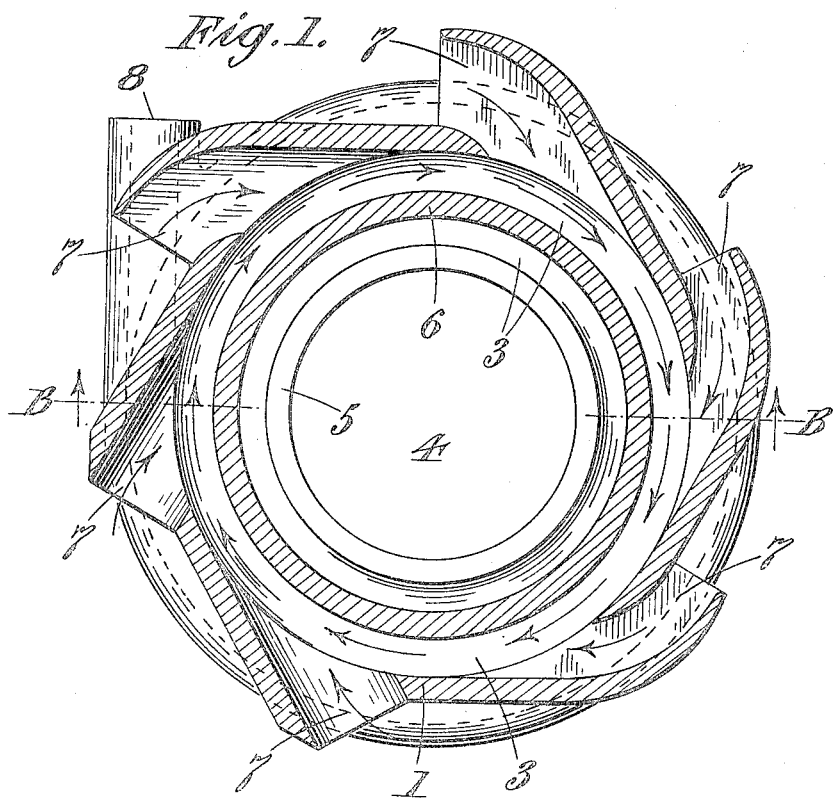
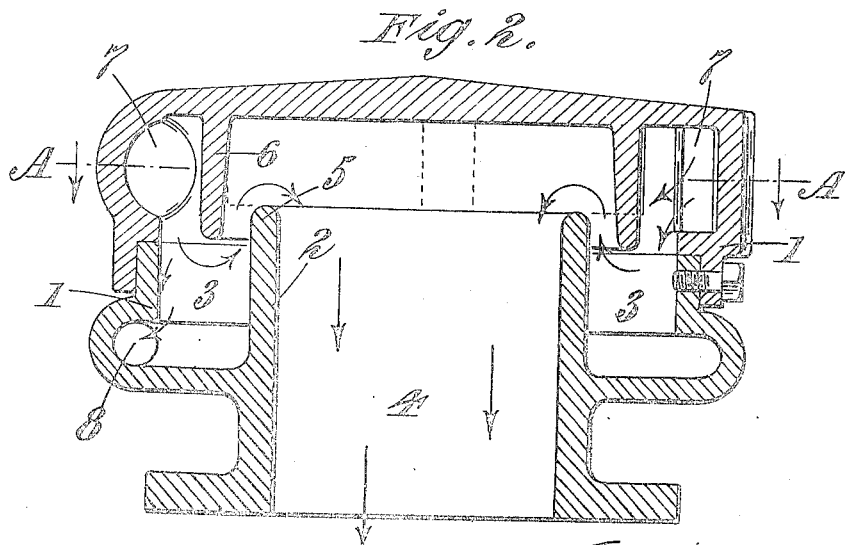
Inventor
Albert E. Tompkins

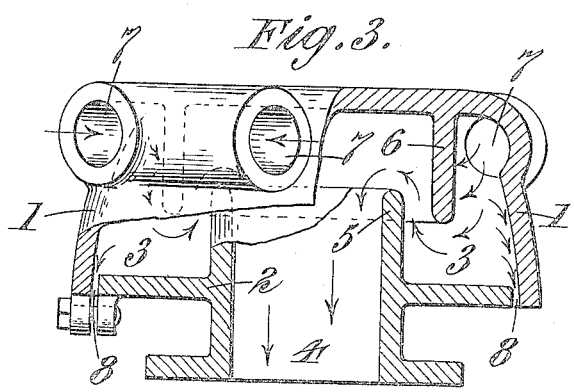
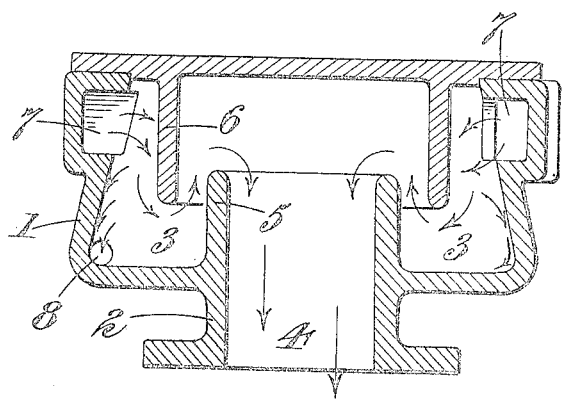

Patented Jan. 20, 1925.

1,523,916

UNITED STATES PATENT OFFICE.

ALBERT EDWARD TOMPKINS, OF BROCKENHURST, ENGLAND.

APPARATUS FOR SEPARATING LIQUIDS FROM GASES OR FOR THE DRYING OF AIR AND GASES, PARTICULARLY APPLICABLE AS A STEAM DRIER.

Original application filed January 15, 1923, Serial No. 612,762. Divided and this application filed November 22, 1923. Serial No. 676,455.

*To all whom it may concern:*

Be it known that I, ALBERT EDWARD TOMPKINS, a subject of the King of Great Britain, and resident of Brockenhurst, England, have invented new and useful improvements in apparatus for separating liquids from gases or for the drying of air and gases, particularly applicable as a steam drier, of which the following is a specification.

This invention of improvements in apparatus for the drying of air and gases, or the separation of liquids from gases, has relation in particular to apparatus for separating water from steam, and the term "steam drier" herein employed is intended to cover apparatus for any or all of the purposes mentioned.

The invention has relation to steam driers of the vortex type and has for its object the provision of improvements which shall enable certain advantages to be obtained.

The invention forming the subject matter of the present application is a division of the co-pending application Serial No. 612,762 filed January 15, 1923.

Referring now to the accompanying drawings:—

Fig. 1 is a sectional view on the line A—A of Fig. 2; and

Fig. 2 is a vertical section on the line B—B of Fig. 1;

Figs. 3 and 4 are vertical sectional views of modified embodiments;

In carrying out the invention, according to the embodiment illustrated in Figs. 1 and 2, a steam drier comprises an outer casing 1 and an inner casing 2, concentrically disposed and constituting between them a water separating chamber 3. The inner casing 2 constitutes the steam outlet 4 and also the annular baffle 5 surrounding the steam outlet; which may be supplemented by a second annular baffle 6 surrounding the end of the casing 2 contained within the outer casing 1, which end is open and in direct connection with the water separating chamber 3. The second annular baffle 6 comes directly in front of the steam inlets 7 which are constituted in the outer casing 1 and open directly into the water separating chamber 3, the inlets being such that the steam passing therethrough has righ velocity rotary flow imparted to it. The steam inlets 7 may be of various shapes and in the drawings circular, square and oblong inlets are illustrated. In consequence of the high velocity rotary flow imparted to the steam by the steam inlets 7 as the steam enters the water separating chamber 3, the contained water in the steam is separated out by centrifugal force and is caused to travel in a spiral path around the inner face of the outer wall of the water separating chamber 3 towards the water discharge outlet 8 which is separated by the annular baffle 5 from the steam outlet 4. The water is discharged at its maximum velocity and tangentially to the periphery of the water separating chamber 3, the water passing through the outlet 8 which is in the form of a tangentially disposed duct or pipe and is situated at the maximum diameter of the water separating chamber 3.

In the modified embodiment illustrated in Fig. 3 the water discharge outlet 8 is shown as a slot formed between the periphery of the flange or ring portion 9 on the casing 2 and the inner face of the outer casing 1, and as a continuation of the outer wall of the water separating chamber 3.

The direction of the slot 8 is parallel or substantially so, with the axis of the drier, and the water travels therethrough in a spiral path and is discharged from this opening in a direction tangential to the outer wall thereof.

The dimensions of the water separating chamber 3, measured radially, may be the same for the whole of its length or may progressively increase in one direction, illustrated in the embodiment shown in Fig. 4.

The water separating chamber may be provided with more than one set of steam inlets and when two or more sets are employed the drier may have one or more steam outlets.

What I claim is:—

1. A steam drier comprising a casing structure including a steam inlet, a steam outlet, an annular water separating chamber interposed between the steam inlet and steam outlet, a water discharge outlet situated at the maximum diameter of the water separating chamber and arranged to discharge the water in a direction tangential to the inner periphery of said chamber, and an annular baffle surrounding the steam outlet, said steam inlet being constituted through the outer wall of the water separating chamber and formed and arranged therein to impart high velocity rotary motion to the steam passing therethrough.

2. A steam drier comprising a casing structure including a steam inlet, a steam outlet, an annular water separating chamber interposed between the steam inlet and steam outlet, a water discharge outlet situated at the maximum diameter of the water separating chamber and arranged to discharge the water in a direction tangential to the inner periphery of said chamber, and an inner casing constituting the steam outlet and also an annular baffle surrounding the steam outlet, said steam inlet being constituted through the outer wall of the water separating chamber and formed and arranged therein to impart high velocity rotary motion to the steam passing therethrough.

3. A steam drier comprising a casing structure including a steam inlet, a steam outlet, an annular water separating chamber interposed between the steam inlet and steam outlet, a water discharge outlet situated at the maximum diameter of the water separating chamber and arranged to discharge the water in a direction tangential to the inner periphery of said chamber, an inner casing constituting the steam outlet and also an annular baffle surrounding the steam outlet, and a supplementary annular baffle situated between the steam inlet and the inner casing, said steam inlet being constituted through the outer wall of the water separating chamber.

4. A steam drier comprising a casing structure including an annular water separating chamber, a steam inlet thereto constituted through the outer wall of the chamber and formed therein to impart high velocity rotary flow to the steam as it passes therethrough, a steam outlet from the separating chamber, an annular baffle surrounding said outlet, a water discharge outlet disposed at the maximum diameter of the separating chamber and adapted to discharge the separated water when moving at its maximum velocity and tangentially thereof.

5. A steam drier comprising a casing structure including an annular water separating chamber, a steam inlet thereto constituted through the outer wall of the chamber and formed therein to impart high velocity rotary flow to the steam as it passes therethrough, a steam outlet from the separating chamber, an annular baffle surrounding said outlet, a water discharge outlet disposed at the maximum diameter of the separating chamber and constituted of an opening coaxial with the axis of the drier through which the water is discharged in a direction tangential to the outer wall of said operating chamber.

6. A steam drier comprising a casing structure having a steam inlet formed through the outer circumferential wall of said casing, a steam outlet, an annular water separating chamber between the steam inlet and the steam outlet, a water discharge outlet at the maximum diameter of the water separating chamber arranged to discharge the water in a direction tangential to the inner periphery of said chamber, and said steam inlet discharging directly into said chamber tangentially to the periphery thereof to impart high velocity rotary motion to the steam discharged therethrough.

Dated this 5th day of November, 1923.

ALBERT EDWARD TOMPKINS.